Figure 1:
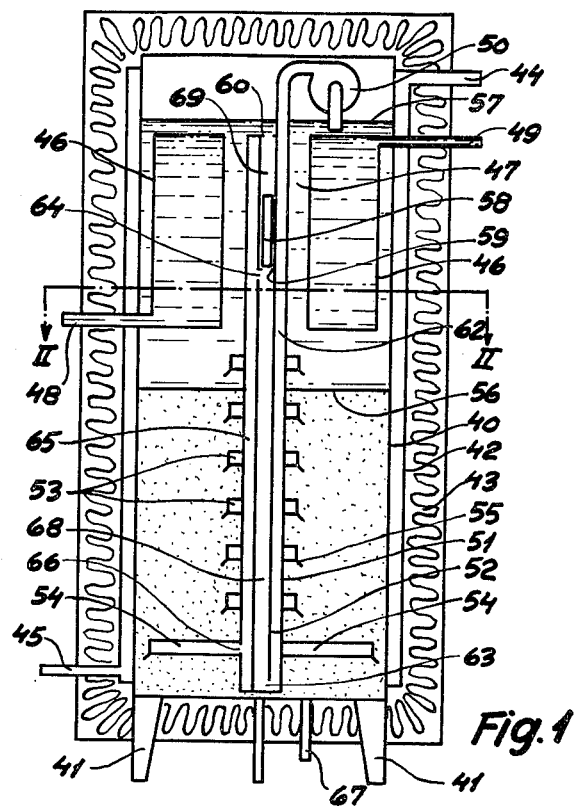

United States Patent [19]

Helshoj

[11] 4,371,028
[45] Feb. 1, 1983

[54] HEAT STORAGE DEVICE

[75] Inventor: Egon Helshoj, Holte, Denmark

[73] Assignee: Effex Innovation A/S, Copenhagen, Denmark

[21] Appl. No.: 206,484

[22] PCT Filed: Jan. 18, 1980

[86] PCT No.: PCT/DK80/00008
§ 371 Date: Sep. 17, 1980
§ 102(e) Date: Sep. 17, 1980

[87] PCT Pub. No.: WO80/01509
PCT Pub. Date: Jul. 24, 1980

[30] Foreign Application Priority Data

Jan. 22, 1979 [DK] Denmark ............................ 261/79

[51] Int. Cl.³ ............................................. F28D 21/00
[52] U.S. Cl. .................................... 165/10; 126/436;
165/111; 165/34
[58] Field of Search ................ 165/10, 104.11, 104.17,
165/111, 34; 126/436

[56] References Cited

U.S. PATENT DOCUMENTS 4,127,161 11/1978 Clyne et al. .
4,219,072 8/1980 Barlow ........................... 165/111 X

FOREIGN PATENT DOCUMENTS 2343848 3/1974 Fed. Rep. of Germany .
2360833 3/1978 France .
2370931 6/1978 France .
2389844 12/1978 France .

Primary Examiner—Albert W. Davis, Jr.
Attorney, Agent, or Firm—Fleit & Jacobson

[57] ABSTRACT

In a heat storage device comprising a container (40) which contains a salt hydrate, the heat of fusion of which is utilized to provide high heat capacity in relation to the volume, oil is circulated by a pump (50) through a number of channels (62, 65) leading to outlet openings (55) distributed in the salt hydrate. A slide valve (58, 69), the sliding valve body (58) of which is influenced by the pressure on the delivery side of the pump, automatically controls the distribution of oil to the channels in such a manner that solidification of the salt hydrate during heat discharge from the storage takes place in a regular progressive way so that the oil can always find non-blocked outlet openings to flow through.

10 Claims, 7 Drawing Figures

HEAT STORAGE DEVICE

The present invention relates to a heat storage device comprising a container which contains a storage material for storing and supplying heat during melting and solidification respectively, and means for pumping a heat carrying medium through a circuit in which it is brought into heat exchange contact with the storage material, of the kind described.

It is well known that many phase-change materials such as certain salt hydrates have a high heat of fusion that offers interesting possibilities of low temperature (less than 100° Celsius) heat storage, for instance for solar heating systems or for off-peak charging of electric water heaters.

Such salt hydrates absorb large amounts of energy in the melting process which transforms their crystal structure into a liquid melt or solution. When the process is reversed and the hot melt is cooled to the melting point, it gradually solidifies through formation and growth of salt crystals, at the same time releasing the latent heat that was absorbed in the melting process.

Toxicity, flammability, chemical instability, and high price are factors that eliminate many salt hydrates from consideration. Among remaining candidates there are a few with particularly promising combinations of properties, for instance sodium sulfate decahydrate, sodium acetate and sodium thiosulfate pentahydrate. However, they are also like in having poor thermal conductivity in crystal form which tends to inhibit their discharge of the latent heat. This is the problem with which the present invention is concerned.

If a conventional heat exchanger is used, the heat discharging process causes a steadily growing layer of crystals to form on the heat exchanger walls, resulting in a rapidly decreasing heat transfer rate. This may be counteracted through the use of greatly increased heat transfer surfaces, which, however, makes the construction both voluminous and costly.

Another solution to the problem is the use of direct contact heat transfer by means of an immiscible oil, i.e. an oil which has no tendency to mix with the salt solution. The oil is pumped through nozzles located at the bottom of the salt hydrate container. Because of its low specific gravity the oil rises rapidly through the salt solution, absorbing or giving off heat in the passage. This heat exchange between oil and solution is highly effective.

One known device of this kind has a horizontal oil pipe near the container bottom. From downward pointed nozzles in the pipe the oil rises freely to the surface when the salt hydrate is in liquid form. To permit operation when the nozzles are blocked by salt crystals the far end of the horizontal pipe is connected with a vertical pipe extending above the surface of the salt hydrate, establishing and oil circulation route by-passing the nozzles and hence always open. It has the effect of conducting heat from the hot oil to the nozzles. From the vertical pipe the hot oil is directed to the salt hydrate surface where the melting action continues.

The time consumed in the melting of a solid crystal block may be considerable. If extra water is added to the salt hydrate, for instance to avoid incongruent melting, a constant operation of the pump will tend to keep the solidified salt hydrate in a slurry or mush form, a condition that can speed the melting process.

A worse condition occurs during discharge operations, i.e. when the storage is giving off heat to the circulating oil. This process goes on smoothly only as long as the temperature of the solution is above the melting point of the salt hydrate. When it sinks below that point, the solution suddenly appears filled with countless tiny crystals which start growing in size. Their appearance and growth are accompanied by a release of energy that tends to maintain a temperature slightly below the melting point. The rising oil droplets keep the smaller crystals suspended in the liquid while the larger ones sink slowly to the bottom. Here they gradually block the nozzles, thus drastically reducing the oil flow long before all the liquid is solidified and its latent heat recovered.

If the pump is stopped, whether accidentally or on purpose, the crystals on the bottom tend to freeze into a solid structure which effectively seals off any remaining pinholes in nozzle openings.

The purpose of the present invention is to ensure a continuous flow of oil whenever desired so that latent heat can be recovered at will as long as any is left in the storage.

In accordance with the invention this purpose is obtained in that said circuit comprises one or more channels connecting the delivery side of a pump to a plurality of outlet openings or groups of outlet openings distributed in the storage material, and that at least one valve means is provided which is arranged to open and close the connections between the delivery side of the pump and the outlet openings or groups of openings in a predetermined sequence.

Figure 2:
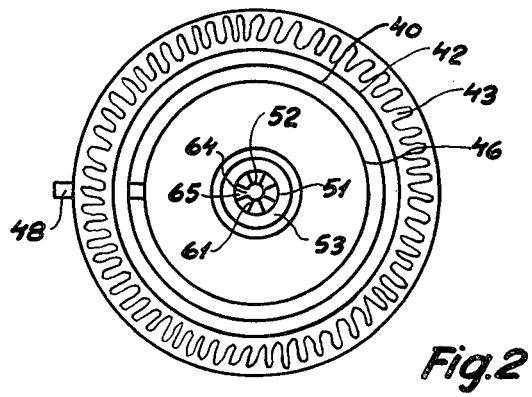
Figure 3:
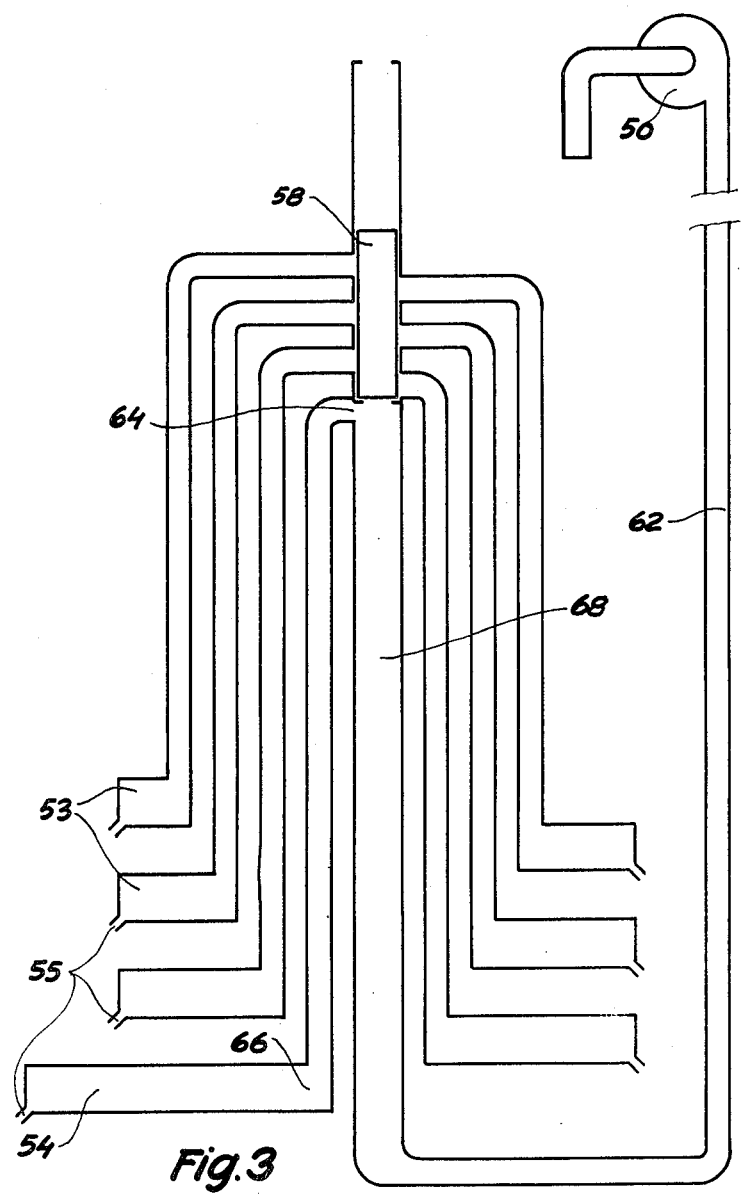
Figure 5:
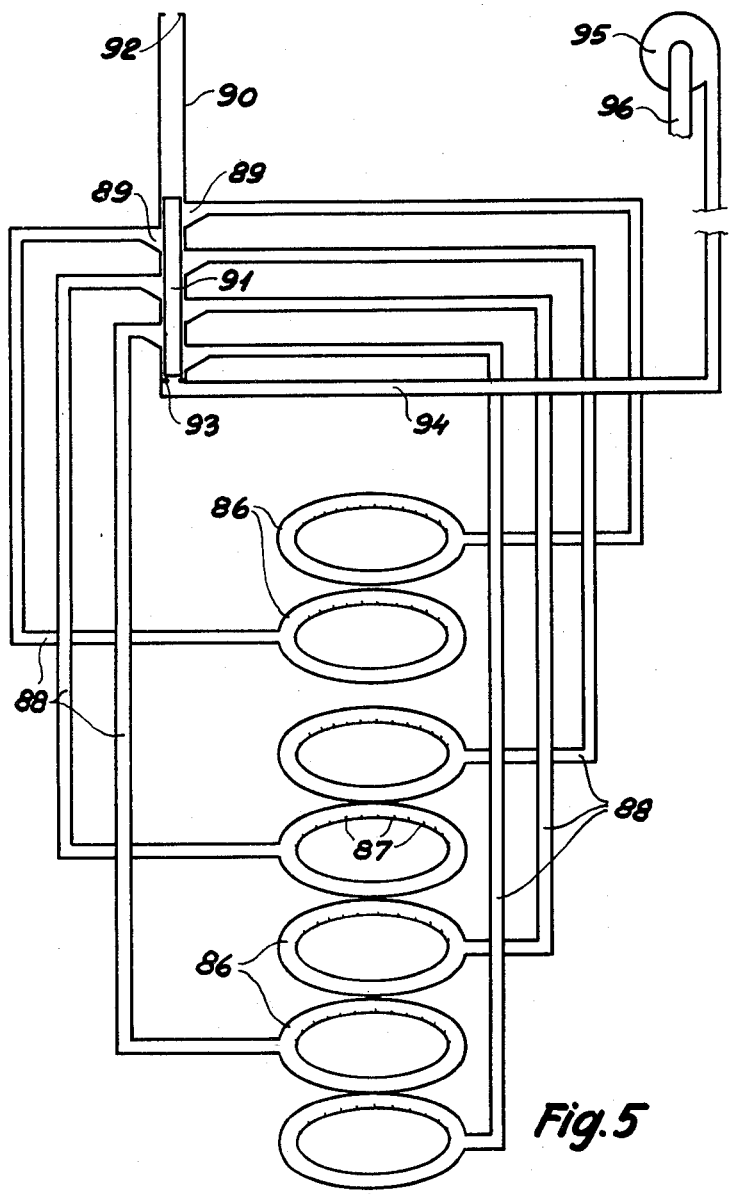
Figure 6:
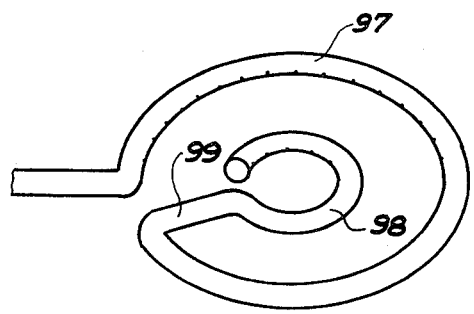
Figure 7:
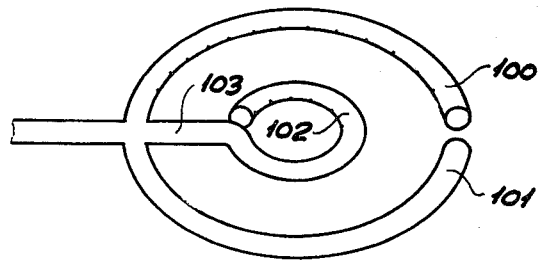

The invention shall be explained in more details in the following with reference to the drawings in which FIG. 1 shows a vertical section through one embodiment of the invention, FIG. 2 a horizontal section along line II—II in FIG. 1, FIG. 3 is a schematic representation of the circuit of the heat carrying medium, FIG. 4 a vertical section through another embodiment of the invention, FIG. 5 a schematic representation of the circuit of the heat carrying medium in the latter embodiment, and FIGS. 6 and 7 are perspective views showing modified embodiments of outlet devices of the heat carrying medium.

In the embodiment of the invention shown in FIGS. 1, 2 and 3, a cylindrical, airtight container 40 with legs 41 is surrounded by a jacket 42, both enclosed in a heat insulating layer 43. The jacket 42 has at the top an inlet pipe 44 and at the bottom an outlet pipe 45 allowing the circulation of a hot liquid, as from a solar collector, through the space between the jacket 42 and the container 40.

In the upper part of the container 40 there is a water tank 46 in the shape of a cylinder with a center channel 47 of relatively large diameter. The water tank 46 has at the bottom an inlet pipe 48 for cold water and at the top an outlet pipe for hot water.

Above the water tank 46 there is a pump 50 whose pressure side is connected with a vertically extending pipe unit, consisting of a cylindrical outer pipe 51 and a cylindrical center pipe 52 which forms a center channel 68, both of said pipes 51 and 52 being coaxial with the container 40. In the lower part of the container 40 the outer pipe 51 is fitted with seven nozzle chambers 53 in the shape of low cylinders. The lowest nozzle chamber has a number of hollow radial spokes 54. Each nozzle chamber 53 and the spokes 54 have a number of nozzle openings 55, facing obliquely downwards.

The container 40 is filled to the level 56 with a suitable salt hydrate, for instance sodium thiosulfate pentahydrate. Above the salt hydrate and up to the level 57 the container is filled with an immiscible oil. The heat expansion of the salt hydrate and the oil is absorbed by compression of the air above the level 57.

The top part of the center pipe 52 contains a movable valve body in the shape of a relatively heavy sliding piston 58 whose movement in the pipe is restricted downwards by a stop collar 59 and upwards by a stop collar 60. Said top part of the center pipe forms a valve chamber 69.

Radial walls 61 at 45° angular distances divide the space between the outer pipe 51 and the center pipe 52 into eight vertical channels. One channel 62 is connected at its tip with the pressure side of the pump 50 and at its bottom through an opening 63 with the center channel 68. The center pipe 52 has a further opening 64 just below the sliding piston 58, connecting it with another one 65 of the vertical channels. This channel 65 in turn is connected through an opening 66 with the lowest nozzle chamber.

The other six channels are connected through openings that are offset axially and along the circumference of the center pipe 52 with the valve chamber 69 in such a way that each opening connects with a different one of the six channels, which in turn is connected each with its respective one of the nozzle chambers 53 through openings in the wall of the outer pipe 51. The openings in the wall of the valve chamber 69 are exposed successively by the upward movement of the sliding piston 58.

FIG. 3 is a schematic illustration of the piston valve and the connections it controls between the pump and the various nozzle chambers.

In its lowest position the piston 58 allows the oil from the pump 50 free access to the lowest nozzle chamber 53. A slightly higher position of the piston gives an additional free access to the next higher nozzle chamber, and so on. In its top position the piston gives the oil access to all seven nozzle chambers.

When cold, all the salt hydrate will be in the form of solid crystals in a more or less coherent block. If a hot liquid is circulated through the inlet pipe 44, the space between the jacket 42 and the container 40, and the outlet pipe 45, the container 40 and its contents of salt hydrate and oil is heated. At a preset temperature of the oil in the container 40 the pump 50 is started automatically. It is assumed here that the heat supply continues, raising the temperature of the oil above the melting point of the salt hydrate.

The pump 50 will attempt to force the oil from the container 40 through the channel 62, the opening 63, the center channel 68, the opening 64, the channel 65 and opening 66 into the lowest nozzle chamber 53 and its spokes 54 and out through the nozzle openings. As the latter will be blocked by solid salt hydrate the pump pressure lifts the piston 58, until connection is established through one or more of the openings in the center pipe 52 with one or more nozzle chambers having free nozzle openings. Since the top nozzle chamber is placed at a level above the salt hydrate, an unobstructed flow is always possible through the nozzles of that chamber.

The heat will soon melt a thin layer of salt hydrate on the inner wall of the container 40, thereby de-blocking the nozzles at the ends of the spokes 54 and allowing an oil flow between the container wall and the salt hydrate. At the same time the oil flow from the top nozzle chamber will melt the top layers of the salt hydrate and, very soon, the crystals blocking the nozzles in the next lower nozzle chamber 53.

Each time the number of open nozzles is thus increased, the pressure under the piston 58 decreases, and at intervals the piston will sink downwards by its own weight and reduce the number of open channel connections to the nozzle chambers. In this way the oil flow is shifted downwards from each nozzle chamber to the next one, until all the salt hydrate in the container is melted, or until the heat supply ceases.

If all the salt hydrate in the container 40 is melted, the oil flows through the lowest nozzle chamber. If the heat supply ceases and hot water is drawn from the tank 46, the oil temperature will gradually sink to the point where the liquid salt hydrate begins to re-solidify while liberating heat. In order for this process to start without significant supercooling, seed crystals must be present. This is ensured here by the fitting in the bottom of the container 40 of a small tube 67 with seed crystals. They will provide the starting point for an unfailing crystal growth at a temperature just below the melting point of the salt hydrate. The crystal growth will gradually block the nozzles of the lowest nozzle chamber 53 and its spokes 54, thereby causing the pump pressure to lift the piston 58 enough to provide a new outlet through the next higher nozzle chamber, and so on.

As a consequence of the agitation caused by the oil flow crystal growth takes place in accordance with the discharge of heat. It is accompanied by a corresponding liberation of heat which tends to maintain the oil temperature in the vicinity of the melting point of the salt hydrate during the entire process until all the salt hydrate is solidified.

Figure 4:
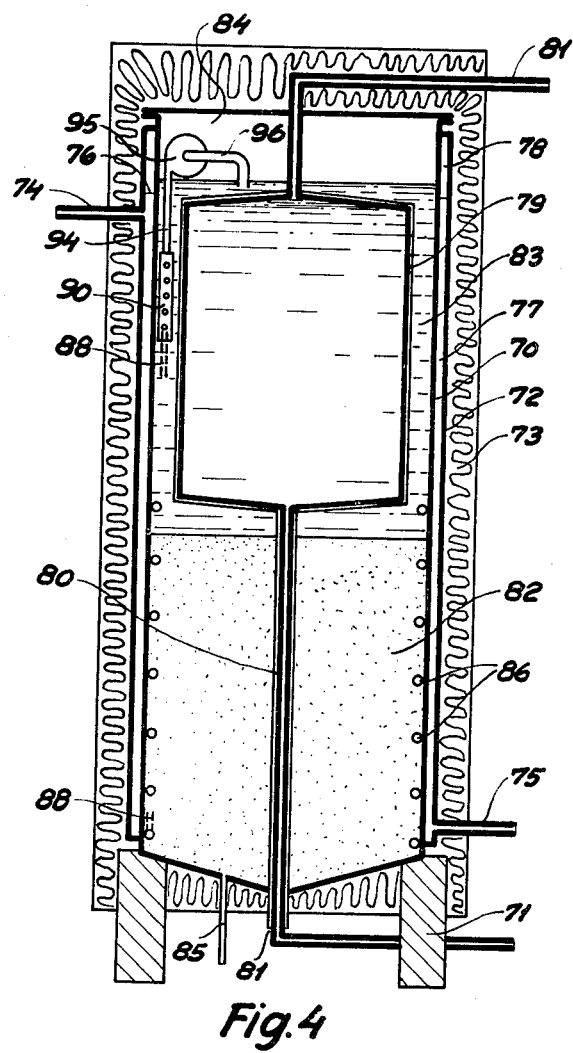

In the embodiment of the invention shown in FIGS. 4, 5, 6 and 7 a cylindrical, airtight container 70 is mounted on a heat insulating wooden base 71 and surrounded by a jacket 72. The container and the jacket are enclosed in a heat insulating layer 73. At the top the jacket 72 has an inlet pipe 74 and at the bottom an outlet pipe 75 for a heat carrying liquid, conducted from and to a heat source not shown, for instance a solar collector. In FIG. 4 the liquid surface in the space 77 between the jacket and the container is marked 76. The air-filled space above the liquid is intended to absorb the heat expansion of the liquid.

In the upper part of the container 70, and coaxially with it, is mounted a water tank 79, which is at its bottom connected with an inlet pipe 80 for cold water and its top with an outlet pipe 81 for hot water. The tank 79 and the vertical part of the inlet pipe 80 have double walls, the outer wall having corrugations that provide both heat conducting contact and a passageway for liquids between the walls in order that liquid entering through a possible leak will run out of the lower end 81 of the outer pipe and thus disclose the leak.

The container 70 is partly filled with a quantity of salt hydrate, for instance sodium thiosulfate pentahydrate, shown in FIG. 4 in its solid form. Above the salt hydrate is a quantity of an immiscible oil 83, and above the oil an air-filled space 84. In the bottom of the container 70 is fitted a small tube 85 with seed crystals.

Below the water tank 79 the inner wall of the container 70 has a number of nozzle pipes in the shape of horizontal, circular pipes 86 with nozzle openings 87 facing downwards and inwards as indicated in FIG. 5. These nozzle pipes, of which the top one is placed above the salt hydrate level, each has a connection through a pipe or hose 88—of which only one is suggested in FIG. 4—with a respective one of a corresponding number of axially spaced openings 89 in a vertical cylinder or valve housing 90. A sliding piston 91 can move freely in the cylinder between an upper stop collar 92 and a lower stop collar 93. A pipe or hose 94 connects the lower end of the cylinder 90 with the pressure side of a pump 95 whose suction pipe 96 extends into the oil 83.

In the situation shown in FIG. 4 with the salt hydrate in solid form, the circulation of a hot liquid, as from a solar collector, through the pipe 74, the jacket space 77 and the pipe 75, will heat the container 70 and its contents of salt hydrate 82 and oil 83. The pump 95 is started automatically, and since the solid salt hydrate blocks the nozzle openings 87 in all nozzle pipes except the top one, the oil pressure in the pipe 94 will lift the piston 91 to a position above the uppermost of the openings 89 in the cylinder 90, permitting the hot oil to flow out through the nozzles in the top nozzle pipe 86 above the top surface of the salt hydrate 82. The heat conducted from the liquid in the jacket space 77 through the container wall will soon melt a thin layer of salt hydrate on the inside wall, creating an open passage for the oil through the second nozzle pipe 86 from the top. This will cause the piston 91 to sink by its own weight and close the top one of the openings 89.

After some time the nozzle openings 87 are melted open all the way down along the inside of the container 70, and the piston 91 will have lowered itself to a position giving the oil access to the bottom nozzle chamber 86 only. From here the hot oil rises through the melted salt hydrate along the inside wall of the container, melting a steadily increasing quantity of the solid salt hydrate in the center of the container. The process continues until all the salt hydrate is melted, or until the heat supply ceases. The oil passes some of its heat to the water in the tank 79, and the heat supply from the solar collector may be automatically discontinued, when the water reaches a preset temperature.

When hot water is drawn from the tank 79, cold water will enter through the pipe 81, and a cooling of the oil takes place. When the oil temperature sinks below a preset level—in the case of sodium thiosulfate pentahydrate about 46° Celsius—the pump 95 is started automatically, causing the cooler oil to rise from the lower nozzle pipe 86 through the melt. This makes some of the salt hydrate recrystallize and liberate heat that is absorbed by the oil which in turn gives off heat to the water tank 79.

The tiny salt crystals formed grow larger, sink to the bottom where they will sooner or later block the nozzle openings in the bottom nozzle pipe. That raises the oil pressure and the piston 91 is lifted to conduct the oil through the next higher nozzle pipe, and so on.

The piston valve as shown in FIG. 5 has an added function in that the piston 91 in its bottom position closes all the openings 89. This prevents melted salt hydrate from entering the nozzle pipes in case of pump stoppage, whether accidental or on purpose.

When the external heat source is inactive, as a solar collector at night, and no hot water is drawn from the tank 79, the only heat loss is caused by transmission through the insulating layer 73, the base 71 and sundry pipe connections. In this situation there is no need for continuous and power-consuming operation of the pump 96. An automatic control may switch the pump over to intermittent function with for instance one minute of operation every five minutes. The combined effect of the pump and the weight of the piston 91 will keep all oil pipes constantly filled with oil, even when slight temperature drops cause the oil to contract. This ensures instant oil circulation each time the pump is restarted.

The placement of the pump in the air space above the oil effectively utilizes the motor heat which is partly transmitted to the oil passing through the pump.

In the construction shown the piston valve is placed vertically in the container 70 and the piston is only controlled by gravity. In principle the valve may be placed in many other ways, and the piston may be spring controlled.

Also the arrangement of nozzle pipes may have various configurations. FIGS. 6 and 7 show two versions where the outer nozzle pipe 97—corresponding to the nozzle pipes 86 in FIGS. 4 and 5—is supplemented with an inner nozzle pipe 98, connected in series with the outer ring through a radial pipe 99. To compensate for the considerable difference in distance between the first and the last nozzles in the pipes, the nozzle apertures may have increasing diameters along the pipes. In the version shown in FIG. 7 the distances are reduced by splitting the outer nozzle ring into two parallel-connected semicircles 100 and 101, and by parallel-connecting the inner ring 102 with the two semicircles through a pipe 103.

When the salt hydrate has a melting point above the required hot water temperature, as in the cases of sodium acetate and sodium thiosulfate, an auxiliary electric heating element may be fitted in the water tank. When the water temperature falls below 45° Celsius and the storage is fully discharged, the electric heater may be switched on automatically.

Conversion into an electric heater for off-peak charging requires only minor modifications. The heating element would be placed in the oil just beneath the water tank, and instead of the external inlet and outlet pipes 74 and 75, connections would be established to integrate the space 77 in the oil circuit served by the pump 95.

While the configurations shown in FIG. 1 and 4 both have built-in water heating tanks, the invention may equally wheel be applied to heat storage devices for other purposes.

I claim:

1. A heat storage device comprising a container which contains a storage material for storing and supplying heat during melting and solidification, respectively, and means including a pump for pumping a heat carrying medium through a circuit in which it is brought into direct heat exchange contact with the storage material, characterized in that said circuit comprises a plurality of channels connecting the delivery side of the pump to a plurality of outlet openings or groups of outlet openings distributed in the storage material, and that the device includes valve means located outside the storage material for controlling flow of said heat carrying medium through at least two of said channels connecting the delivery side of the pump and the outlet openings or groups of outlet openings in response to variations in flow resistances.

2. A heat storage device according to claim 1 having a plurality of channels, characterized in that said valve means has a valve chamber in which the inlet ends of said channels form mutually offset outlet ports, and in which a valve body is so movably mounted as to establish in different positions different connections between an inlet port connected to the delivery side of the pump and the outlet ports.

3. A heat storage device according to claim 2, characterized in that the valve body is yieldably urged in one direction and affected by the pressure prevailing in the valve chamber in the opposite direction.

4. A heat storage device according to claim 2 or 3, characterized in that the valve chamber is constituted by a cylinder closed at the bottom end, in or adjacent to which the inlet port is positioned, and that the valve body is constituted by a cylindrical piston.

5. A heat storage device according to claim 4, characterized in that the valve chamber is constituted by the upper portion of a substantially vertical, cylindrical center pipe which is coaxially enclosed by an outer pipe divided into channels by radial partitions, and that each channel communicates at its lower end with a nozzle chamber surrounding the outer pipe and provided with outlet openings through an opening in the wall of the outer pipe.

6. A heat storage device according to claim 5, characterized in that one or more or all of the nozzle chambers has/have a plurality of substantially radial nozzle arms provided with outlet openings, the outer ends of which arms are positioned in the vicinity of the wall of the container.

7. A heat storage device according to claim 2 or 3 characterized in that the channels are connected each with a respective one of a plurality of axially spaced, substantially horizontal nozzle pipes provided with preferably obliquely downwardly facing outlet openings.

8. A heat storage device according to claim 7, characterized in that one or more of the substantially horizontal nozzle pipes is/are ring shaped.

9. A heat storage device comprising a container which contains a storage material for storing and for supplying heat during melting and solidification, respectively, and means including a pump for pumping a heat carrying medium through a circuit in which it is brought into heat exchange contact with the storage material, characterized in that said circuit comprises one or more channels connecting the delivery side of the pump to a plurality of outlet openings or groups of outlet openings distributed in the storage material, and that the device includes at least one valve means for opening and for closing the connections between the delivery side of the pump and the outlet openings or groups of outlet openings in response to variations in flow resistances, said valve means having a valve chamber in which the inlet ends of said channels form mutually offset outlet ports, and in which a valve body is so movably mounted as to establish in different positions different connections between an inlet port connected to the delivery side of the pump and the outlet ports.

10. A heat storage device according to claim 4, characterized in that the channels are connected each with a respective one of a plurality of axially spaced, substantially horizontal nozzle pipes provided with preferably obliquely downwardly facing outlet openings.

* * * * *